United States Patent [19]

Murrell et al.

[11] 4,039,622
[45] Aug. 2, 1977

[54] CATALYTIC PROCESS FOR $NO_X$ REDUCTION UNDER LEAN CONDITIONS

[75] Inventors: Lawrence L. Murrell, Elizabeth; Samuel J. Tauster, Englishtown, both of N.J.

[73] Assignee: Exxon Research and Engineering Company, Linden, N.J.

[21] Appl. No.: 616,752

[22] Filed: Sept. 19, 1975

Related U.S. Application Data

[63] Continuation-in-part of Ser. No. 520,490, Nov. 4, 1974, abandoned.

[51] Int. Cl.² ............................................. B01D 53/34
[52] U.S. Cl. .................................................... 423/239
[58] Field of Search ................... 423/213.5, 213.7, 239, 423/301

[56] References Cited

U.S. PATENT DOCUMENTS

| 3,637,344 | 1/1971 | Thompson | 423/213.5 |
| 3,849,538 | 11/1974 | Campbell et al. | 423/213.5 |
| 3,886,260 | 5/1975 | Unland | 423/213.5 |

FOREIGN PATENT DOCUMENTS

| 598,396 | 9/1959 | Italy | 423/213.5 |
| 1,009,609 | 11/1965 | United Kingdom | 423/213.5 |

*Primary Examiner*—G. O. Peters
*Attorney, Agent, or Firm*—Joseph J. Allocca

[57] ABSTRACT

It has been discovered that supported iridium catalysts will selectively reduce $NO_X$ under lean conditions in a critical temperature range.

10 Claims, No Drawings

CATALYTIC PROCESS FOR NO$_x$ REDUCTION UNDER LEAN CONDITIONS

CROSS-REFERENCE OF RELATED APPLICATION

This application is a continuation-in-part of Ser. No. 520,490 filed Nov. 4, 1974, now abandoned. This invention relates to a novel This for selectively removing NO$_x$ from waste exhaust gas effluents, i.e. exhaust gases from stationary sources. This invention relates to a method for purifying industrial gases which are the waste or stack gases from nitric acid plants and various nitration processes which contain unreacted NO$_x$. Such gases constitute a widespread air pollution problem, and many processes have been developed or proposed for removing the contaminants which are, primarily, nitrogen dioxide and nitric oxide. The presence of the oxides of nitrogen in the tail gases is due to the incomplete conversion of the nitrogen oxides to nitric acid and, as a result, the noxious oxides of nitrogen have been discharged to the atmosphere heretofore with the tail gases. The discharge of these oxides of nitrogen to the atmosphere is undesirable for the reason they are of a corrosive nature and present risk of injury to vegetable and animal life. Since the dioxide exists in equilibrium with the dimer N$_2$O$_4$, it is common practice to refer to the two oxides of tetravalent nitrogen collectively as nitrogen dioxide.

The nuisance and health menace created by the exhaust gases of stationary plant sources of pollution have inspired the invention of many devices for their abatement. Carbon monoxide and unburned hydrocarbons can be removed by mixing large quantities of air with the hot gases in the exhaust lines of plants. This results in the oxidation of carbon monoxide and unburned hydrocarbons to carbon dioxide and water. However, the oxides of nitrogen are not removed by this procedure.

Various solutions have been advanced for the removal of these oxides of nitrogen but all have suffered because of the need for the existence of a high fuel to air ratio, in other words, the purification processes did not work, or worked very inefficiently in the lean area.

Under the prior art, heterogeneous catalysis is considered one of the promising methods for controlling pollutants in automobile exhaust as well as in industrial plants. Considerable effort has been expended in the search for a catalyst capable of simultaneous removal of all pollutants in a single catalytic reactor. At present, decomposition of the oxides of nitrogen has not been demonstrated to occur at sufficiently high rates with known catalysts for general applications. However, reduction of NO by CO or H$_2$ is sufficiently rapid for utilization in pollution control devices of practical size. Various publications have demonstrated such techniques. They are as follows: Taylor, F. R., "Air Pollution Foundation Report", No. 28 (1959); Roth, J. E., Doerr, R. C., "Industrial Engineering Chemistry," 53, 293 (1961), Baker, R. A., Doerr, R. C., "Air Pollution Control Association Journal", 14, 409 (1964) and Baker, R. A., Doerr, R. C., "Industrial Engineering Chemical Processes Design Development", 4, 188, (1965). All of these articles have demonstrated various methods for controlling such pollutants. To ensure that all components in the exhaust stream are at precisely the proper levels for simultaneous removal in a single reactor (i.e. NO by CO or H$_2$ and oxidation of CO, H$_2$ and hydrocarbon by O$_2$) extremely close control of the air to fuel ratio insuring rich mixture over all operating conditions is required as described in the paper by Bernstein, R. S., Raman, A.K.S., Wegg, E. E., Presentation to Technical Session "Engines and Emissions", Central States Section, The Combustion Institute, Ann Arbor, Mich., 1971, as well as in the paper by Jones, J. H., Kummer, J. T., Otto, K., Shelef, K., Weaver, E. E., Presentation to Joint Meeting of A.I.Ch.E. and Instituto Mexicano de Ingenieros Quimicos, Control of Nitrogen Oxides Pollution Session, Denver, Col., 1970.

In addition to these publications, there are numerous patents dealing with the problem of NO$_x$ pollution and advancing methods and processes for the removal or abatement of such contamination. U.S. Pat. No. 3,053,613 issued on Sept. 11, 1962 teaches a process for removing NO$_x$ from gases having O$_2$ and NO$_x$ present. However, the patent discloses a two-stage reaction process whereby ammonia is added to the gas in a primary zone and catalytically treated to reduce the NO$_x$ and then these treated gases are transferred to a secondary zone and there catalytically treated to recover heat from the gas. In numerous other processes described in the above patent, NO$_x$ is removed from exhaust gases by the use of extremely high temperature over a catalyst, which has the effect of causing the catalyst to lose activity, or by the injection of additional fuel into the exhaust gases so as to be present in excess over the stoichiometric oxygen content of the waste gas. The main feature of these processes is, however, the necessity of there being rich conditions present before significant NO$_x$ removal occurs. Another drawback is demonstrated by U.S. Pat. No. 3,245,920 which discloses that although ammonia has been utilized as fuel because it effects selective removal of the nitrogen oxides without removing the O$_2$ present, the catalyst becomes inactive within a month or two and hence is unsatisfactory. In light of this, other processes have been advanced. See for example, U.S. Pat. Nos. 2,975,025; 3,032,387; 2,970,034 in which fuel is injected into the exhaust gases to promote the removal of the NO$_x$ or a two-stage process is demonstrated in which fuel is again injected to run the reaction at rich conditions.

U.S. Pat. No. 2,975,025 demonstrates the use of noble metal catalyst systems for the reduction of NO$_x$ with NH$_3$ or other fuel in the presence of O$_2$. For a system comprising 2.9–3.2% O$_2$, 0.27–0.36% NO on an 0.5% Pd on activated alumina a with CO as the fuel, no conversion of NO is observed. CO and O$_2$ are reacting preferentially in a T range of 130°–238° C. This preference for the reaction of CO + O$_2$ over CO + NO$_x$ led many to believe that low temperature catalytic reduction of NO under lean conditions was impossible.

U.S. Pat. No. 3,637,344 to C. E. Thompson discloses a method of treating exhaust gases of internal combustion engines. In that patent, The exhaust-gases of internal combustion engines are contacted with a ruthenium-iridium catalyst to reduce the pollutants discharged into the atmosphere. The ruthenium-iridium catalyst system is effective in removing NO$_x$, CO and unburned hydrocarbons from exhaust gases. For the reduction of nitrogen oxides, the exhaust gases of internal combustion engines are preferably contacted with the ruthenium-iridium catalysts at temperatures in excess of 500° C. in the presence of small amounts of free oxygen, i.e. less than about 2.0 percent oxygen on a total volume basis. This condition is easily met by the engine running under rich conditions so as to run smoothly and generate high power under load. The exhaust gases coming from the combustion chamber of an internal combustion engine will contain only very small amounts of oxygen, i.e. less than 1% on a total volume basis. Thompson demonstrates the advantages of his ruthenium-iridium catalyst system by comparing it with ruthenium alone and iridium alone. The iridium comparison run is of special importance. A test gas containing 1.5% CO, 0.5% $H_2$, 12% $CO_2$, 12% $H_2O$, 275 ppm propane, 1500 ppm NO was contacted with 0.02 wt. % Ir on 99.98% $Al_2O_3$ in the presence of 0% $O_2$ and 0.8% $O_2$ and the degree of $NO_x$ conversion obtained is presented. With 0.8% $O_2$ available 90% conversion $NO_x$ is obtained. Careful examination of this information is important for a complete understanding of what is and is not being demonstrated. With 0.8% $O_2$ present, the system being tested is not a lean system as that term is defined for the instant invention. The gas has 1.5% CO and 0.5% $H_2$ present. There is no excess oxygen present since the 1.5% CO consumes 0.75% $O_2$ and the 0.5% $H_2$ will consume 0.25% $O_2$. These two reducing gases alone consume at least 1.0% $O_2$. The gas tested only contains 0.8% $O_2$. Clearly the system has no excess oxygen when compared to reductants and therefore the system is not lean. The test gas will be reducing in nature when all the reactants are reacted to completion. By way of contrast, in the instant invention, it has been discovered that iridium will facilitate the catalytic reduction of $NO_x$ even when the overall nature of the gas being treated is oxidizing because of the presence of excess oxygen, and this reduction will occur within a specific critical temperature range.

Though it is readily seen that extensive research has been conducted in the area of the catalytic removal of $NO_x$ from exhaust gases, the processes presented all suffer from the drawback of being restricted to operation within a narrow but terribly high and catalytically destructive temperature band or of being inefficient when run at lean conditions; lean conditions being defined as the presence of a stoichiometric excess of $O_2$ over reductants in the exhaust gases. Historically, it has been believed that such excess would render a $NO_x$ reduction operation inoperative because of the competition between $NO_x$ and $O_2$ for the available CO present. However, it is this very area of lean operating conditions which should be subject to $NO_x$ reduction if a catalyst system of enhanced desirability is to be achieved. The subject invention is directed particularly to solving of this problem and meeting this requirement.

It is an object of the instant invention to provide an improved process for the removal of nitrogen oxide from waste gas streams.

Another object is to provide an improved catalytic process for the elimination of nitrogen oxides from waste gas streams in which the overheating of the catalyst is prevented.

A further object of the invention is to facilitate the elimination of nitrogen oxides from waste gas streams which are rich in $O_2$, i.e., to remove $NO_x$ from lean waste gas streams.

An additional object is to provide a process for the removal of $NO_x$ from waste gas streams by a catalyst system utilizing low catalyst loadings at low temperatures under lean conditions.

It has been found that a critical temperature range window exists for iridium noble metal catalysts within which the $NO_x$-CO reduction reaction can be carried out under lean conditions at low catalyst loading levels. At lower temperatures, the conversion rate is dependent on the activity of the particular catalyst used while at higher temperatures, the conversion is limited by possibly the competition between NO and $O_2$ for the available CO, the possible unfavorable competition between reactants for the available surface active sites and the high temperature stability of the catalyst in an oxidizing medium.

For purposes of this invention, the oxides of nitrogen referred to collectively as $NO_x$ constitute a family of air contaminants, the most important of which are as follows:

| Formula | Chemical Name | Physical Description |
| --- | --- | --- |
| NO | Nitric Oxide | Colorless, odorless gas |
| $NO_2$ | Nitrogen Dioxide | Brown, pungent gas |
| $N_2O_4$ | Dinitrogen Tetroxide | Brown, volatile liquid |
| $N_2O$ | Nitrous Oxide | Colorless, odorless gas |

Of these, $N_2O$ can be eliminated from consideration as an air contaminant. Emission sources of this material are rare and at low concentrations, it has no effect. At concentrations over 30%, it is useful as an anesthetic. $N_2O_4$ is a polymer of $NO_2$ which exists when $NO_2$ is compressed and liquefied. When diluted in air, $N_2O_4$ does not exist in significant amounts.

The present invention relates to a method for treating a waste product stream or exhaust, under lean conditions, containing $NO_x$ and other contaminants, said method comprising the step of contacting in a reaction zone, said stream with an iridium catalyst wherein the concentration of iridium ranges from 0.0001 to 5.0% and the temperature ranges from 300° to 750° C. for a sufficient time to substantially reduce the $NO_x$ to molecular nitrogen.

The catalyst used in the process of this invention is iridium metal. Suitable catalyst supports are alumina, including activated alumina and the like, silica, silica gel, diatomaceous earth and other similar metal catalyst support.

For optimum conversion, the catalyst should be within the range of about 0.0001% to about 5.0% by way of catalyst metal and support material total weight and preferably from about 0.001% to 0.1% iridium. The temperature of the reaction should be between 300°-750° C. and preferably between 350°-600° C. The support for the catalyst metal may be in the form of pellets, granules or powder of standard support material such as alumina, silica or other inorganic refractory oxides or any other readily available stable and inert support material upon which iridium will attach itself, but preferably comprises alumina. The total surface area offered by the support is not critical since in experiments, iridium which volatilized and coated a stainless steel reactor vessel with trace amounts of iridium, activated the vessel and allowed reduction of $NO_x$. The support should, however, offer sufficient surface to allow good dispersion of the catalyst metal and offer a secure anchorage for the catalyst. Supported catalysts may be prepared in any suitable manner, i.e. by treating the carrier or support with a solution of a suitable metal compound and then reducing the metal compound to metal.

The lean effluent waste streams which may be treated in accordance with this invention contain as reactive components $O_2$, and NO with CO and other reducing gases such as $H_2$ or hydrocarbons also being present, the oxygen concentration in the lean effluent being in stoichiometric excess over the total concentration of reducing gases [CO, $H_2$, or hydrocarbons]. This waste stream may contain inert components such as water and carbon dioxide. For the nitric oxide in the above described waste stream to be converted into nitrogen requires that there be sufficient carbon monoxide present to convert significant concentration of the nitric oxide to nitrogen. That is, at least an equivalent concentration of carbon monoxide should be present as compared to the concentration of nitric oxide. This lower limit of the carbon monoxide concentration is due to the stoichiometry of the reaction; $NO + CO \rightarrow \frac{1}{2} N_2 + CO_2$. Effective nitric oxide conversion to nitrogen can be achieved with higher concentrations of carbon monoxide in the waste stream. With a lean gas mixture the carbon monoxide not utilized in reaction with nitric oxide will combine with excess oxygen according to the following reaction, $\frac{1}{2} O_2 + CO \rightarrow CO_2$. Normally such a reaction competes with $NO + CO \rightarrow \frac{1}{2} N_2 + CO_2$ and thereby interferes with NO reduction and thereby reducing the amount of conversion obtained. It is the unique property of iridium to effect selective reaction of carbon monoxide with nitric oxide in the presence of excess oxygen in the waste stream which is the basis of this invention. Platinum and the other Group VIII metals have very poor selectivity for the NO-CO reaction in a lean waste stream. The presence of hydrogen or hydrocarbon reduction gases in the waste stream do not reduce the efficacy of iridium to effect selective reaction of carbon monoxide with nitric oxide in the presence of excess oxygen in the lean waste stream. The lean waste stream may be defined as one in which the total concentration of oxygen is in stoichiometric excess over the total concentration of reducing gases, be they CO, $H_2$, or hydrocarbon gases. Thus, when such a gas stream is reacted to completion, the residuum gas will contain excess oxygen. Again, there is the requirement for operability of an iridium catalyst that the initial concentration of carbon monoxide be at least equal to the concentration of nitric oxide in the waste stream. Two descriptions of exemplary waste streams will now be discussed. One waste stream will contain no reducing gas other than carbon monoxide, the other waste stream will contain CO, $H_2$, and hydrocarbon reduction gases. The following description of a waste stream containing only carbon monoxide as the reducing gas will be helpful in understanding the scope of the invention:

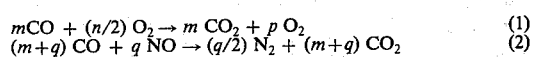
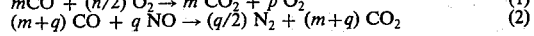

$$mCO + (n/2) O_2 \rightarrow m CO_2 + p O_2 \quad (1)$$
$$(m+q) CO + q NO \rightarrow (q/2) N_2 + (m+q) CO_2 \quad (2)$$

when $m = n$ there will of course be no excess oxygen and $p = 0$ if $q = 0$. Now consider the case where NO = 0.1%, i.e. $q = 0.1$, and $m = 2m$, and where CO = 1.1% giving $m = 1.0$. In this situation, there will be 1% $O_2$ in the initial precatalytic treatment feed stream since $n = 2.0$. The reaction (2) will go to completion despite the fact that there is excess $O_2$ in the gas feed with $p = 0.5$ or 50% excess $O_2$ in the postcatalytic treatment exit exhaust gas. In defining "leanness" as used in this invention, it is referring in part to the relationship between $O_2$ and CO. For example, an exhaust gas containing 4% $O_2$ and 2% CO would have 300% excess oxygen (or put another way 3% free oxygen in excess) and would be considered lean. Varying the % CO present, however, would obviously alter the ratio between these two materials and hence, affect the leanness of the system. Therefore, in any practice of this invention, it is envisioned that real exhaust gases will be treated and that such gas will have excess oxygen up to about 750% excess, that is, for every % CO present, there will be no more than 8% $O_2$ in the gas meaning a maximum 750% excess of $O_2$ in the exhaust stream to be treated.

For a waste stream containing hydrogen and hydrocarbon reducing gases along with carbon monoxide, the following description will be helpful in understanding the scope of the invention:

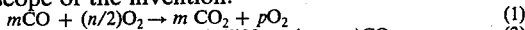
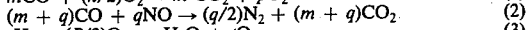
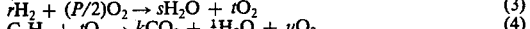
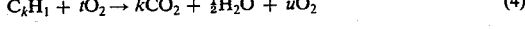

$$mCO + (n/2)O_2 \rightarrow m CO_2 + pO_2 \quad (1)$$
$$(m + q)CO + qNO \rightarrow (q/2)N_2 + (m + q)CO_2 \quad (2)$$
$$rH_2 + (P/2)O_2 \rightarrow sH_2O + tO_2 \quad (3)$$
$$C_kH_1 + tO_2 \rightarrow kCO_2 + \frac{1}{2}H_2O + uO_2 \quad (4)$$

Assuming that the hydrogen and hydrocarbon reducing gases react to completion, the net oxygen in excess will be the quantity $uO_2$. Calculating the percent excess oxygen after reaction with the concentration of carbon monoxide not utilized in reaction with NO plus the concentration of hydrogen plus the concentration of hydrocarbon reducing gases will give the leanness of the waste stream used in this invention. If some of the hydrocarbon reducing gases are not combusted to completion, they will act as inert components and to the extent they are uncombusted simply contribute indirectly to increase the percent excess oxygen in the waste stream by failing to utilize such $O_2$. The present invention is effective for nitric oxide containing waste gas streams where the calculated percent oxygen is in excess (assuming complete combustion of reducing gases of the total concentration) regardless of whether the reducing gases, particularly hydrocarbons, undergo complete reaction with oxygen. Incomplete reaction of hydrocarbon reducing gases with excess oxygen will only serve to not decrease the amount of excess oxygen in the residuum waste stream (thereby rendering the final exhaust gas lean).

The optimum conversion of nitric oxide to nitrogen in a lean waste stream occurs for a nitric oxide concentration within the range of 0.01% to 5.0% and preferably within the range 0.1 to 1.0%. The concentration of carbon monoxide in such a waste stream being at least equal to the nitric oxide concentration and more preferably four times the nitric oxide concentration and most preferably greater than four times the nitric oxide concentration. The concentration of oxygen in excess over the total reductants is not particularly critical and the oxygen in excess may be as high as 8% (which converts to about 800% excess oxygen) but preferably about 4% oxygen in excess and most preferably about 2% oxygen in excess.

An example of a gas stream containing a small concentration of hydrocarbon undergoing complete reaction over an iridium catalyst is given below. The gas concentrations in this gas stream will be 0.2% NO, 0.6% CO, 0.2% $H_2$, 1.4% $O_2$ and 0.04% propane (400 ppm), the balance of the gas stream being He. For complete reaction of all of the above components with selective reaction of CO with NO, the following equations are applicable:

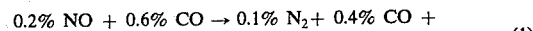
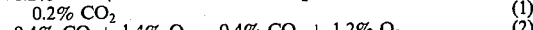
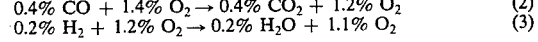

$$0.2\% \text{ NO} + 0.6\% \text{ CO} \rightarrow 0.1\% \text{ N}_2 + 0.4\% \text{ CO} + 0.2\% \text{ CO}_2 \quad (1)$$
$$0.4\% \text{ CO} + 1.4\% \text{ O}_2 \rightarrow 0.4\% \text{ CO}_2 + 1.2\% \text{ O}_2 \quad (2)$$
$$0.2\% \text{ H}_2 + 1.2\% \text{ O}_2 \rightarrow 0.2\% \text{ H}_2\text{O} + 1.1\% \text{ O}_2 \quad (3)$$

$$0.04\% \text{ C}_3\text{H}_8 + 1.1\% \text{ O}_2 \rightarrow 0.12\% \text{ CO}_2 + 0.16\% \text{ H}_2\text{O} + 0.74\% \text{ O}_2 \quad (4)$$

The above equations are not implied by the above ordering to occur in sequential order. The important point is that the hydrocarbon component if reacted completely with oxygen in the above gas stream would remove about 0.4% $O_2$. Reaction 1 in the above case over the instant iridium catalyst, would go nearly to completion regardless of the conversion of the hydrocarbon component to $CO_2$ and $H_2O$. The above example is overall lean with the oxygen concentration in excess over total reductants of 0.74%.

The preferred range of hydrocarbon components in the gas stream, when converted into an equivalent amount of $H_2$ as reductant (and expressed as a % $H_2$) would be within the range 0.001 to 6.0%, more preferably, within the range 0.001 to 2.0% and most preferably, within the range 0.001 to 0.5%. For example, 0.1% $C_3H_8$ is equivalent to 0.5% $H_2$ as reductant, that is, 0.1% $C_3H_8$ reacts with 0.25 $O_2$ in complete combustion to $CO_2$ and $H_2O$; since by comparison 0.5% $H_2$ is the amount required for complete combustion with 0.25% $O_2$ to give $H_2O$, and 0.5% $H_2$ is approximately equivalent to 0.1% $C_3H_8$ as a typical hydrocarbon.

The gas to be treated is passed over the catalyst at a space velocity in the range of about 2,000 to 400,000 standard volumes of gas per volume of catalyst per hour, preferably about 10,000 to 100,000 standard volume of gas per volume of catalyst per hour. The reaction takes place at between 0 to 150 psig and preferably between atmospheric to slightly above.

The invention will be further illustrated by reference to the following examples but it is to be understood that they are merely illustrative and are not to be taken as limitations on the invention:

EXAMPLE 1

A Vycor reactor vessel was charged to 0.5 g of 0.1% iridium catalyst on alumina diluted to 5 cc 20/40 mesh beads. Each run consisted of three distinct steps, a rich downscan; i.e. upon completion of $H_2$ reduction at ca. 550° C., feed was set at 0.1% NO, 2% CO, 0.5% $O_2$, SV = 2.10$^5$ hr.$^{-1}$, (giving an equivalent 200,000 V/V/hr. flow rate), and a rapid downward temperature sweep ensued, (ca. 100° C/5 min.). At low temperature, NO conversion ceased, whereupon the feed was altered to 0.1% NO, 2.0% CO, 1.5% $O_2$, SV = 2.10$^5$hr.$^{-1}$, and a rapid upscan was taken. Upon reaching 550° C, a downscan was made under the same (lean) conditions. The breadth of the temperature window is indicated in Table I by $\Delta_{50}$ and $\Delta_{150}$. These refer to the temperature range over which the NO is controlled to within 50 ppm or 150 ppm respectively, of the level at maximum conversion. Only the lead downscan is represented in the Table. $T_{50}$ are the temperatures at which 50% NO conversion is found during RICH downscan.

TABLE I

| Cata-[1] lyst | Max.[2] Conv.% | $T_{50}$[3] | $\Delta_{50}$[4] | $\Delta_{150}$[5] | $\delta$[6] | $\lambda$[7] |
|---|---|---|---|---|---|---|
| .1 Ir | 91 | 330 | 50 | 80 | 13 | Medium |
| .1 Ir | 87 | — | 83 | 113 | — | V.Small |
| .1 Ir | 87 | 320 | 48 | 81 | 37 | Large |

TABLE I-continued

| Cata-[1] lyst | Max.[2] Conv.% | $T_{50}$[3] | $\Delta_{50}$[4] | $\Delta_{150}$[5] | $\delta$[6] | $\lambda$[7] |
|---|---|---|---|---|---|---|
| .1 Ir | 93 | 339 | 62 | 150 | 19 | Large |

[1] All cats. supported on $\eta$-$Al_2O_3$. Metal components listed as per cents weight.
[2] This refers to maximum NO removal achieved during the lean downscan.
[3] This gives T, ° C at which 50% NO removal was achieved during the rich downscan.
[4] $\Delta 50$ is the temperature range, ° C, over which effluent NO was within 50 ppm of minimum recorded during lean downscan.
[5] Same as above, except substitute 150 ppm for 50 ppm.
[6] $\delta$ refers to the temp. difference, ° C, between the 50% conversion points for the rich and lean downscans.
[7] $\lambda$ assigns a qualitative value to the difference between the lean upscan and lean downscan.

This example serves to demonstrate that effective nitric oxide conversion to nitrogen can be achieved for a gas stream containing ca. 0.6% stoichiometric oxygen in excess following complete reaction with the carbon monoxide present. No hydrocarbon gases were present in the catalyst runs of Table I. This example is to be compared to other metal catalysts investigated which exhibited much reduced effectiveness for $NO_x$ conversion to nitrogen with comparable gas compositions.

EXAMPLE 2

A 0.01% and a 0.001% Ir catalyst were subjected to the same treatment as in Example 1. Table II shows the results. Comparison of Tables I and II indicates that dilution of iridium by one or two orders of magnitude has not affected the maximum conversion. Catalysts as low as 10 ppm in iridium loading levels achieve conversion well above 90% at high space velocities and in the presence of 50% excess $O_2$. At sufficiently high temperature and with lean inlet gas conditions, CO is completely consumed.

Thus CO becomes the critical factor present in shortest supply; the amount of iridium and the contact time both become noncritical.

TABLE II

| Cata-[1] lyst | Max[2] Conv.% | $T_{50}$[3] | $\Delta_{50}$[4] | $\Delta_{150}$[5] | $\delta$[6] | $\lambda$[7] |
|---|---|---|---|---|---|---|
| .01 Ir | 90 | 397 | 50 | >110 | Negl. | Large |
| .01 Ir | 96 | — | 76 | 123 | — | — |
| .01 Ir | 93 | 392 | 40 | 87 | 5 | Small |
| .01 Ir | 93 | 410 | 37 | 72 | 12 | Medium |
| .001 Ir | 95 | 450 | 31 | 71 | Negl. | Large |
| .001 Ir | 96 | 370 | 48 | 71 | 25 | Med.Lg. |

[1]-[7] See footnotes on Table I.

This example serves to demonstrate that very low levels of iridium are effective in selectively converting nitric oxide to nitrogen in the presence of excess oxygen. Complete removal of the only reducing gas present, CO, occurs without loss in conversion of nitric oxide to nitrogen. No hydrocarbon gases were present in the catalyst runs of Table II.

EXAMPLE 3

0.001% Ir on $Al_2O_3$ catalyst was tested using various feedstream compositions of NO, CO, $H_2$, $O_2$, $CO_2$ and $H_2O$. The results of such tests are in Table III.

This example serves to demonstrate that the presence of $CO_2$ and $H_2O$ in the waste gas stream does not result in decreased effectiveness of the 0.001% Ir on $Al_2O_3$ catalyst in reducing nitric oxide to nitrogen in the presence of excess oxygen. There was no hydrocarbon gases present in the catalyst tests reported in Table III so that the present excess oxygen listed is not based on any other reducing gases present except CO and $H_2$, e.g., the effluent gas stream is net lean or oxidizing. This example further serves to demonstrate that $H_2$ does not alter the effectiveness of the 0.001% Ir on $Al_2O_3$ catalyst in reducing the nitric oxide to nitrogen.

TABLE III[1]

| Feed Composition, % | | | | | | Excess[4] | | | |
|---|---|---|---|---|---|---|---|---|---|
| NO | CO | $H_2$[2] | $O_2$ | $CO_2$ | $H_2O$[3] | $O_2$, % | SV, hr$^{-1}$ | T° C | NO Conv., % |
| .15 | .71 | 0 | .56 | 8.6 | 28 | 58 | 2.3 • $10^5$ | 564 | 80 |
| .17 | .62 | .21 | .65 | 10 | 17 | 56 | 1.3 500 $10^5$ | 510 | 90 |
| .18 | .66 | .22 | .72 | 11 | 12 | 64 | 1.2 500 $10^5$ | 540 | 92 |
| | | | | | | | | 610 | 75 |

[1]All data refers to 0.001% $Ir/Al_2O_3$.
[2]$H_2$ was used as a pre-mixed blend with CO: $H_2/CO = \frac{1}{4}$.
[3]$H_2O$ was delivered by a syringe pump. It was fed into the feedline which was tape-heated from the point of introduction. In early experiments, operation of the syringe pump was erratic, leading at times, to values considerably in excess of the desired 12% $H_2O$.
[4]This is computed as $[(2 \times \% O_2 \div \% CO + \% H_2) - 1] \times 100$.

EXAMPLE 4

A 0.1% Ir catalyst on alumina was charged to a Vycor reactor vessel as described in Example 1. The gas feed was set at 0.2% NO, 1.0% CO, and 0.75% $O_2$, the balance of the gas being helium. The CO to NO ratio is 5.0 for this above gas composition. In Example 1 the CO to NO ratio was 20.0. The experimentally measured oxygen and carbon monoxide concentration from the above catalyst at 420° C was found to be 0.35% and 0% respectively. At this temperature nitric oxide conversion was found to be 88%. This example serves to demonstrate the significant selectivity of iridium catalysts to convert oxides of nitrogen to nitrogen under conditions of excess oxygen concentration in the gas mixture. This example also serves to demonstrate that an iridium catalyst is effective in selective conversion of oxides of nitrogen to nitrogen for a ratio of CO to NO of 5.0 in the gas mixture.

EXAMPLE 5

A 0.1% $Ir/Al_2O_3$ catalyst was charged to a Vycor reactor vessel as described in Example 1. The gas feed was set at 0.2% NO, 0.75% CO, 0.25% $H_2$ and 0.75% $O_2$, the balance of the gas being helium. The experimentally measured oxygen and carbon monoxide concentration from the above catalyst at 380° C was found to be 0.38% and 0%, respectively. At this temperature nitric oxide conversion was found to be 76%. This example further serves to demonstrate the significant selectivity of iridium catalysts to convert oxides of nitrogen to nitrogen under conditions of excess oxygen concentration in the gas mixture. This example also demonstrates decreased nitric oxide conversion for a CO to NO ratio of 3.75 compared to 5.0 of Example 4.

EXAMPLE 6

A 0.1% Ru catalyst on alumina was charged to a Vycor reactor vessel as described in Example 1. The gas composition and run conditions were the same as described in Example 1. The 0.1% Ru catalyst on alumina had essentially zero nitric oxide reduction activity to nitrogen for a feed gas composition of 0.1% NO, 2.0% CO, 1.5% $O_2$ with the balance being helium. This example demonstrates that a ruthenium catalyst has no capacity to reduce oxides of nitrogen to nitrogen for lean, or excess oxygen (50% excess), gas compositions where an iridium catalyst exhibits high selectivity, Example 1.

EXAMPLE 7

A 0.1% Re catalyst was charged to a Vycor reactor vessel as described in Example 1. The gas composition and run conditions were the same as described in Example 1. The 0.1% Re catalyst on alumina had essentially zero nitric oxide reduction activity to nitrogen for a feed gas composition of 0.1% NO, 2.0% CO, 1.5% $O_2$ with the balance being helium. This example demonstrates that a rhenium catalyst has no capacity to reduce oxides of nitrogen to nitrogen for lean, or excess oxygen (50% excess), gas compositions where an iridium catalyst exhibits high selectivity, Example 1.

EXAMPLE 8

A 0.1% Pd catalyst on alumina and a 0.1% Pt catalyst on alumina was charged to a Vycor reactor vessel as described in Example 1. The gas composition and run conditions were the same as described in Example 1. Both the 0.1% Pd and 0.1% Pt catalysts on alumina gave about 40% nitric oxide conversion to nitrogen for a feed gas composition of 0.1% NO, 2.0% CO, 1.5% $O_2$ with the balance being helium. This example demonstrates that both a palladium and a platinum catalyst have some capacity to reduce oxides of nitrogen to nitrogen for lean, or excess oxygen (50% excess), gas compositions. This example demonstrates that both a palladium and a platinum catalyst are inferior to an iridium catalyst, Example 1, run under identical condition for the selective reduction of oxides of nitrogen to nitrogen for excess oxygen concentration in the gas feed.

EXAMPLE 9

A 0.01% Rh catalyst on alumina was charged to a Vycor reactor vessel as described in Example 1. The gas composition and run conditions were the same as described in Example 1. The 0.01% Rh catalyst on alumina gave about 75% nitric oxide conversion to nitrogen for a feed gas composition of 0.1% NO, 2.0% CO, 1.5% $O_2$ with the balance being helium. This example demonstrates that a rhodium catalyst has some capacity to reduce oxides of nitrogen to nitrogen for lean, or excess oxygen, gas compositions. This demonstrates that a rhodium catalyst at the same metal weight loading is inferior to an iridium catalyst, Example 2, run under identical conditions for the selective reduction of oxides of nitrogen to nitrogen for excess oxygen concentrations in the gas feed.

What is claimed is:
1. A process for effecting the selective reduction of $NO_x$ in lean effluent waste streams containing $NO_x$, CO, $O_2$, $H_2$, $CO_2$ and water, wherein the concentration of CO is at least equivalent to the concentration of $NO_x$ present in the waste stream, a lean effluent waste stream being defined as one in which the concentration of oxygen is in excess over the concentration of reductants to a level as high as 8%, i.e., about 800% excess oxygen, over the total of reductants present, said reductants being selected from the group comprising CO and $H_2$ so that when such a waste stream is reacted to completion, the residuum is oxidizing in character, said process comprising the steps of contacting said lean exhaust stream in a reaction zone with an iridium catalyst, said contacting occurring at a temperature between 300° to 750° C thereby effecting the selective reduction by CO of the oxides of nitrogen to molecular nitrogen.

2. A process according to claim 1 wherein the iridium is present at a concentration of from 0.0001 to 5.0%.

3. A process according to claim 1 wherein the iridium is present at a concentration of from 0.001 to 1.0%.

4. A process according to claim 1 wherein the iridium is present at a concentration of from 0.01 to 0.1%.

5. A process according to claim 1 wherein the contact temperature is between 350° to 600° C.

6. A process according to claim 1 further characterized by having the iridium catalyst deposited on a support medium.

7. A process according to claim 6 wherein the support material is selected from the group consisting of inert inorganic refractory oxides.

8. A process according to claim 6 wherein the support material is in the form of pellets, granules or powder.

9. A process according to claim 6 wherein the preferred support material is alumina.

10. A process according to claim 1, wherein the lean effluent exhaust waste stream is the waste or stack gases from industrial process plants.

* * * * *